Nov. 24, 1959            A. DEL RASO            2,914,062
SELF-HEATING CAN OF THE TYPE PROVIDED WITH
IMPACT-RESPONSIVE HEATING MEANS
Filed Aug. 15, 1958            2 Sheets-Sheet 1
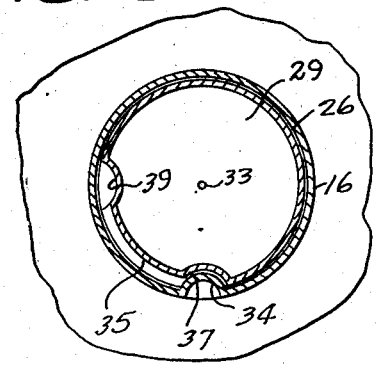
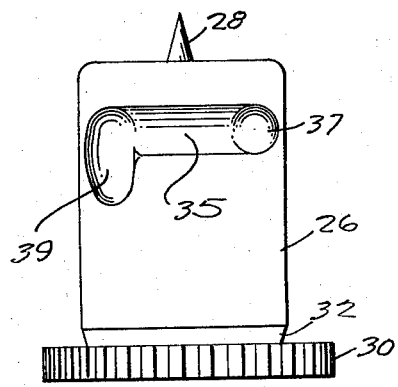
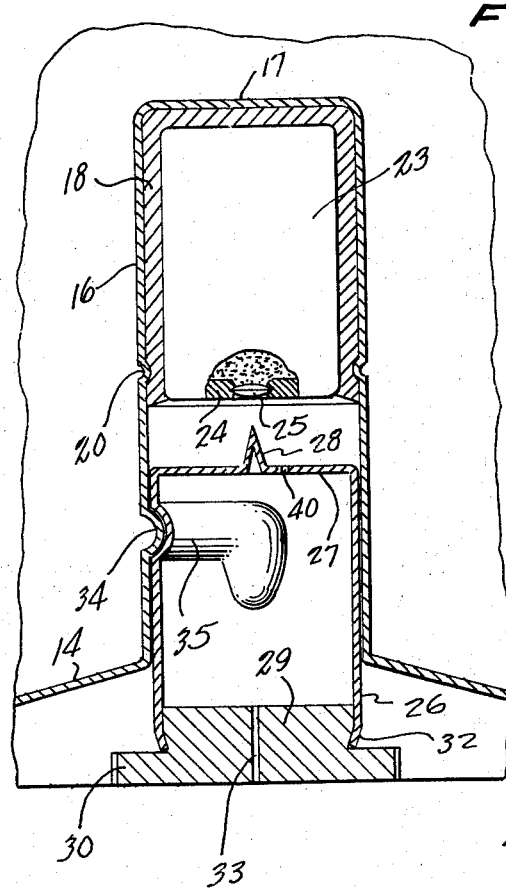
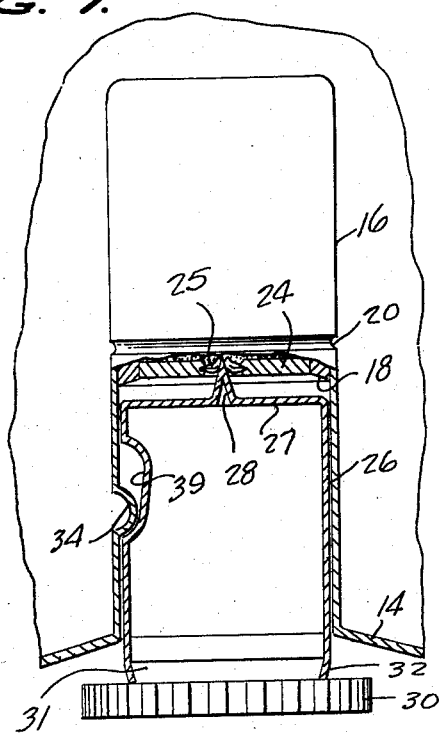
INVENTOR.
AMERICO DEL RASO
BY
McMorrow, Berman & Davidson
ATTORNEYS.

Nov. 24, 1959  A. DEL RASO  2,914,062
SELF-HEATING CAN OF THE TYPE PROVIDED WITH
IMPACT-RESPONSIVE HEATING MEANS
Filed Aug. 15, 1958  2 Sheets-Sheet 2

INVENTOR.
AMERICO DEL RASO,
BY
McMorrow, Berman + Davidson
ATTORNEYS.

United States Patent Office 2,914,062
Patented Nov. 24, 1959

2,914,062

SELF-HEATING CAN OF THE TYPE PROVIDED WITH IMPACT-RESPONSIVE HEATING MEANS

Americo Del Raso, Cleveland, Ohio

Application August 15, 1958, Serial No. 755,237

4 Claims. (Cl. 126—263)

This invention relates to containers, and more particularly to a can provided with impact-responsive heating means.

The main object of the invention is to provide a novel and improved self-heating can which is simple in construction, which is relatively compact in size, and which provides a means for quickly and effectively warming the contents thereof when desired.

A further object of the invention is to provide an improved food container having impact-responsive self-heating means carried thereby, the self-heating means being normally secured to the container in an inconspicuous and protected manner, but being available for use whenever it is desired to heat the contents of the container, the container being inexpensive to fabricate, being arranged so that a number of containers may be readily stacked vertically, one on top of another, and being provided with means to prevent accidental ignition of the self-heating means associated therewith.

A still further object of the invention is to provide an improved food can having impact-responsive heating means carried thereby, the heating means being arranged so that it may be normally locked in an inoperative position, but being releasable manually so that it may be adjusted to operating position whenever it is desired to heat the contents of the can.

Further objects and advantages of the invention will become apparent from the following description and claims, and from the accompanying drawings, wherein:

Figure 5 is an enlarged horizontal cross sectional detail view taken on the line 5—5 of Figure 2.

Figure 6 is an enlarged vertical cross sectional detail view taken on the line 6—6 of Figure 2.

Figure 7 is a vertical cross sectional view similar to Figure 6, but showing the plunger member of the can driven to igniting position.

Figure 8 is an enlarged elevational view of the plunger member employed in the self-heating can illustrated in Figures 1–6.

Figure 1:
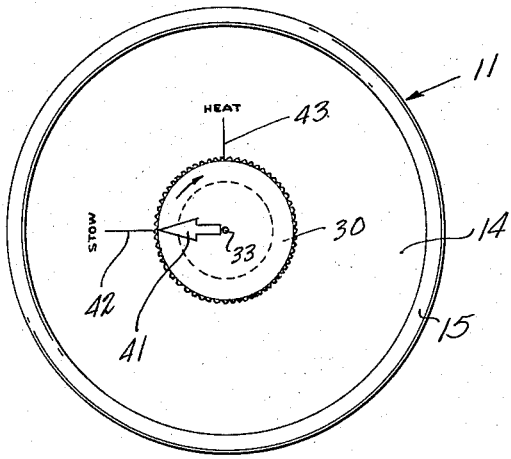
Figure 1 is a bottom view of an improved self-heating can constructed in accordance with the present invention.
Figure 3:
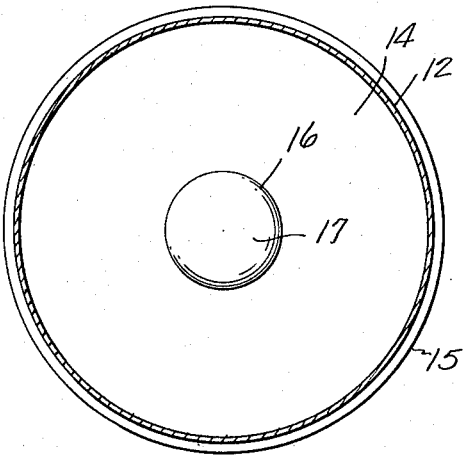
Figure 3 is a horizontal cross sectional view taken on the line 3—3 of Figure 2.

Referring to the drawings, 11 generally designates a can according to the present invention, said can comprising a generally cylindrical vertical main wall 12 which is integrally formed at its top with the horizontal wall 13. The horizontal top wall may be formed integrally, as illustrated in the drawings, but may be formed separately and secured in any conventional manner to the top rim of the vertical wall.

Designated at 14 is the bottom wall of the container, which is generally conical in shape and which is secured in a conventional manner at its outer periphery to the bottom rim of the cylindrical main wall 12, as shown at 15. The bottom wall 14 converges upwardly and inwardly, as illustrated in Figure 2, and is integrally formed with the upstanding, generally cylindrical central chamber 16 having an integral top wall 17.

Figure 2:
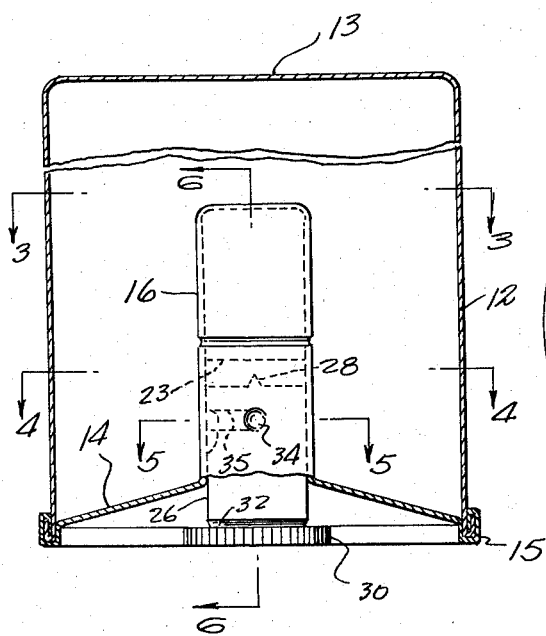
Figure 2 is a vertical cross sectional view taken through the self-heating can of Figure 1.
Figure 4:
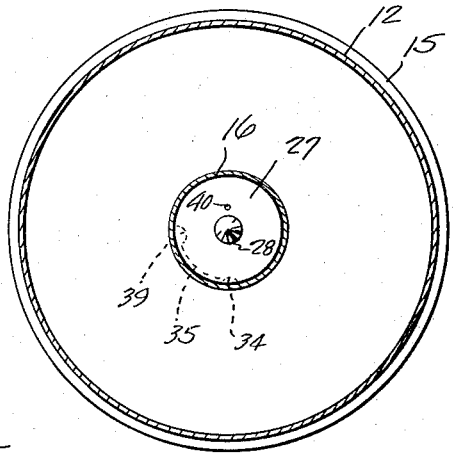
Figure 4 is a horizontal cross sectional view taken on the line 4—4 of Figure 2.

As shown in Figure 2, the cylindrical chamber 16 is located axially in the main cylindrical member 12 and extends upwardly a substantial height therein.

Designated at 23 is a firing cartridge comprising combustible material of well-known composition, the cartridge 23 comprising a non-combustible metal container in which heating chemicals are normally carried.

The cartridge 23 is rigidly secured in the top portion of the cylindrical chamber 16, being insulated therefrom by a lining 18 of refractory, porous material, such as asbestos composition or the like, the lining 18 being tightly engaged between the cartridge 23 and the inner wall surfaces of the chamber 16 and being rigidly secured therein in any suitable manner, for example, by inwardly crimping the intermediate portion of the wall of chamber 16, as shown at 20. Thus, the annular inwardly extending rib defined by the crimped portion 20 acts as a clamping means to tightly secure the cartridge 23 and the intervening lining 18 inside the upper portion of the upstanding chamber 16.

The cartridge 23 is provided centrally of its bottom wall 24 with an ignition cap 25, of well-known composition, which is adapted to rapidly oxidize responsive to intense impact.

Designated at 26 is a hollow plunger member which is positioned in the lower portion of the chamber 16 and which includes the horizontal top wall 27 which is integrally formed at its center with the upstanding, conical, firing pin 28 located in axial alignment with the firing cartridge 23.

Rigidly secured in the lower end of the hollow plunger member 26 is the impact-receiving firing head member 29, which may comprise a body of suitable rigid material, such as molded plastic material, or the like, which is formed with the enlarged bottom portion 30 and which is further formed with the inwardly tapering neck portion 31 located immediately adjacent the enlarged bottom portion 30. The lower rim portion of the hollow plunger member 26 is crimped inwardly, as shown at 32, to rigidly lock the plunger member to the firing head portion 29. Head portion 29 is formed with the axial bore 33 to allow free passage of gases from the interior of the plunger member to the atmosphere, whereby the interior of the plunger member is freely vented and will not be damaged by expansion of gases therein when heated along with the contents of the can.

The periphery of the enlarged head portion 30 is suitably knurled to facilitate rotation of the plunger member manually, for a purpose to be presently explained.

The lower portion of the wall of cylindrical chamber 16 is formed with an inwardly projecting lug element 34 which is engageable in a horizontally extending channel 35 formed in the plunger member 26, as shown in Figures 5 and 6. The channel 35 is slightly less in depth than the radial length of the projection 34, whereby the projection 34 tightly engages in the channel 35 when the plunger member 26 is rotated, the cylindrical wall of the chamber 16 being sufficiently yieldable to allow such rotation. At one end thereof, the channel 35 is formed with a recess 37 which is large enough to receive the projection 34, whereby to yieldably lock the plunger member 26 in the position thereof shown in Figures 5 and 6, namely, in a position wherein the firing pin element 28 is spaced below the ignition cap 25. At its opposite end, the channel 35 merges with a recess 39 which is of substantial vertical height and which is large enough to receive the projection 34 and is of sufficient height to allow the plunger member 26 to be elevated so as to cause the firing pin element 28 to engage the ignition cap 25 with sufficient impact to detonate said cap.

Thus, the plunger member 26 is normally disposed in the position thereof illustrated in Figures 1 to 6, wherein the plunger member 26 is locked against vertical movement in the chamber 16. Under these conditions, the enlarged portion 30 of the member 29 has its bottom surface substantially flush with the bottom plane of the crimped rim 15 of the can, so that a number of cans can be stacked vertically, one on top of the other.

When it is desired to heat the contents of the can, the plunger member 26 is rotated, by means of the knurled knob member 30, to bring the projection 34 into alignment with the vertical channel portion 39, after which the member 29 is manually struck with sufficient force to drive it axially and to cause the pin element 28 to engage the ignition cap 25 with substantial impact. This causes the ignition element 25 to detonate and thus causes ignition of the heating cartridge 23.

Sufficient clearance is provided between the external surface of the plunger 26 and the inside surface of the lower portion of chamber 16 to allow gaseous products of combustion and steam to freely escape from the chamber 16 during the combustion of the contents of the heating cartridge 23. The top wall 27 of the plunger member 26 is further provided with a vent opening 40 through which steam and gaseous products of combustion may pass into the interior of the plunger member, and may subsequently escape to the atmosphere through the central vent opening 33 in the head member 29.

As shown in Figure 1, the bottom surface of the head member 29 may be suitably inscribed with an index element 41, such as an arrow, or the like, which is normally positioned adjacent a first radial index mark 42 provided on the surface of the conical bottom wall 14. The bottom wall 14 is further provided with another radial index mark 43 indicating the required position of the indicating member 41 for placing the plunger member 26 in firing position. Thus, as illustrated in Figure 1, the channel 35 may be of sufficient length so that it is necessary to rotate the chamber 26 through an angle of approximately 90° in order to place the plunger member 26 in firing position.

When it is desired to heat the contents of the can, the operator grasps the knob element 30 and rotates the plunger 26 from the position illustrated in Figure 1 in a clockwise direction to bring the index element 41 into registry with the radial marker 43. This moves the vertical channel portion 39 so that it receives the projection 34, allowing the plunger member to be moved axially. Thereafter, the operator strikes the head member 29 with sufficient force to drive the firing pin 28 into firing engagement with the ignition cap 25, causing detonation of the heating cartridge 23.

While a specific embodiment of an improved self-heating can has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In a can, a vertical main wall, a top wall on said main wall, a bottom wall secured to the bottom rim of said main wall, said bottom wall being formed with a chamber rising a substantial distance vertically, a heating cartridge rigidly secured in said chamber and being provided on its bottom with impact-responsive ignition means, a plunger member slidably and rotatably mounted in the lower portion of said chamber, means to lock the plunger member in a substantially fixed position in the chamber in one rotated position of said plunger member, and a firing pin element on said plunger member subjacent said impact-responsive ignition means.

2. In a can, a vertical main wall, a top wall on said main wall, a bottom wall secured to the bottom rim of said main wall, said bottom wall being formed with a chamber rising a substantial distance vertically, a heating cartridge rigidly secured in said chamber and being provided on its bottom with impact-responsive ignition means, a plunger member slidably and rotatably mounted in the lower portion of said chamber, a projection on the lower portion of the wall of the chamber, said plunger member being formed with a horizontal groove receiving said projection, and a vertical channel at one end of said horizontal groove, whereby the plunger member is free to move vertically when said projection is in registry with said vertical channel and is substantially held against vertical movement in other rotated positions of the plunger member, the other end of said horizontal groove being formed with a recess in which said projection is lockingly engageable, and a firing pin element on said plunger member subjacent said impact-responsive ignition means.

3. In a can, a vertical main wall, a top wall on said main wall, a bottom wall secured to the bottom rim of said main wall, said bottom wall being formed with a central chamber rising a substantial distance vertically and axially in the can, a heating cartridge rigidly secured in said chamber and being provided centrally of its bottom wall with impact-responsive ignition means, a plunger member slidably and rotatably mounted in the lower portion of said chamber, a projection on the wall of the chamber, means on the plunger member lockingly engageable with said projection in one rotated position of said plunger member, whereby to hold said plunger member in a fixed position in said chamber, and an upstanding firing pin element formed centrally on the top wall of said plunger member subjacent said impact-responsive ignition means.

4. In a can, a vertical main wall, a top wall on said main wall, a bottom wall secured to the bottom rim of said main wall, said bottom wall being formed with a central chamber rising a substantial distance vertically and axially in the can, a heating cartridge rigidly secured in said chamber and being provided centrally of its bottom wall with impact-responsive ignition means, a plunger member slidably and rotatably mounted in the lower portion of said chamber, a projection on the lower portion of the wall of the chamber, said plunger member being formed with a horizontal groove receiving said projection and a vertical channel at one end of said horizontal groove, whereby the plunger member is free to move vertically when said projection is in registry with said vertical channel and is substantially held against a vertical movement in other rotated positions of the plunger member, the other end of said horizontal groove being formed with a recess in which said projection is lockingly receiveable, and an upstanding firing pin element formed centrally on the top wall of said plunger member subjacent said impact-responsive ignition means.

References Cited in the file of this patent

UNITED STATES PATENTS

| 2,020,292 | Eggert et al. | Nov. 12, 1935 |

FOREIGN PATENTS

| 856,014 | France | Mar. 4, 1940 |